No. 853,867. PATENTED MAY 14, 1907.
G. S. DEY.
VOTING MACHINE.
APPLICATION FILED SEPT. 11, 1899.
7 SHEETS—SHEET 1.
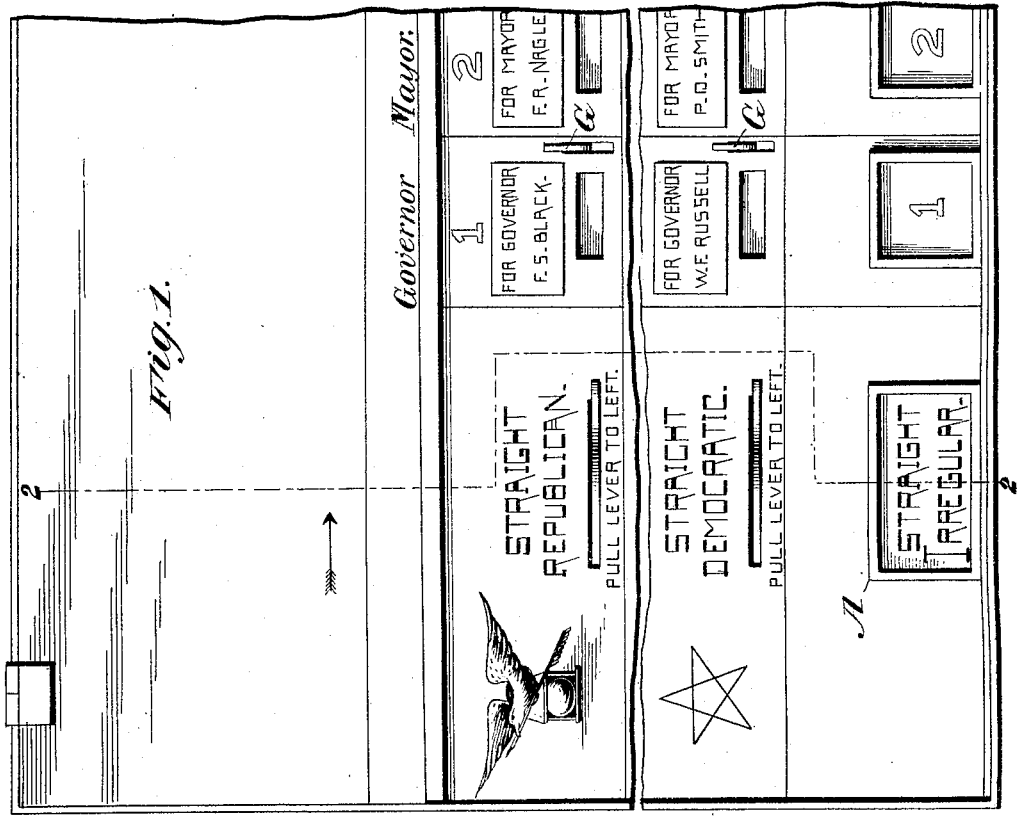
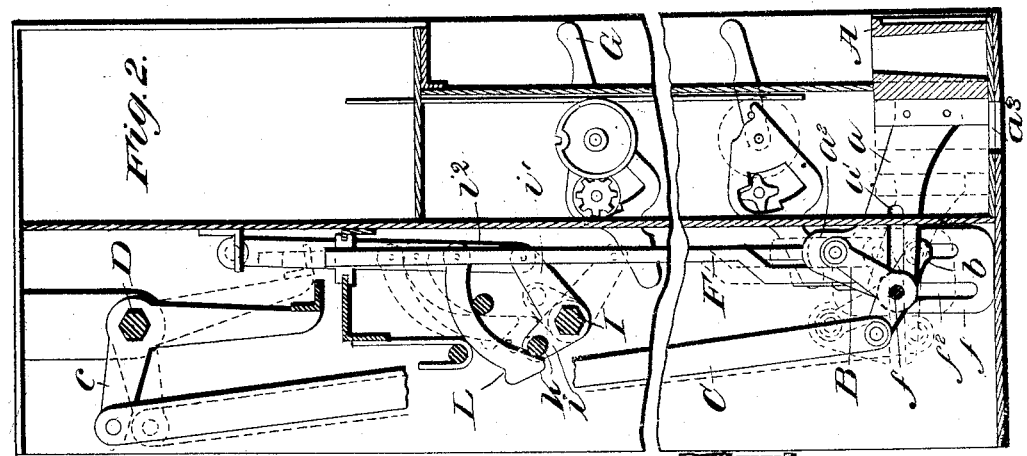
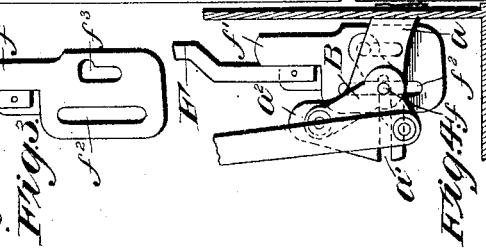
Witnesses
L. C. Hills.
Gustav R. Thompson.
Inventor:
G. S. Dey.
by Wilkinson
& Fisher.
Attorneys

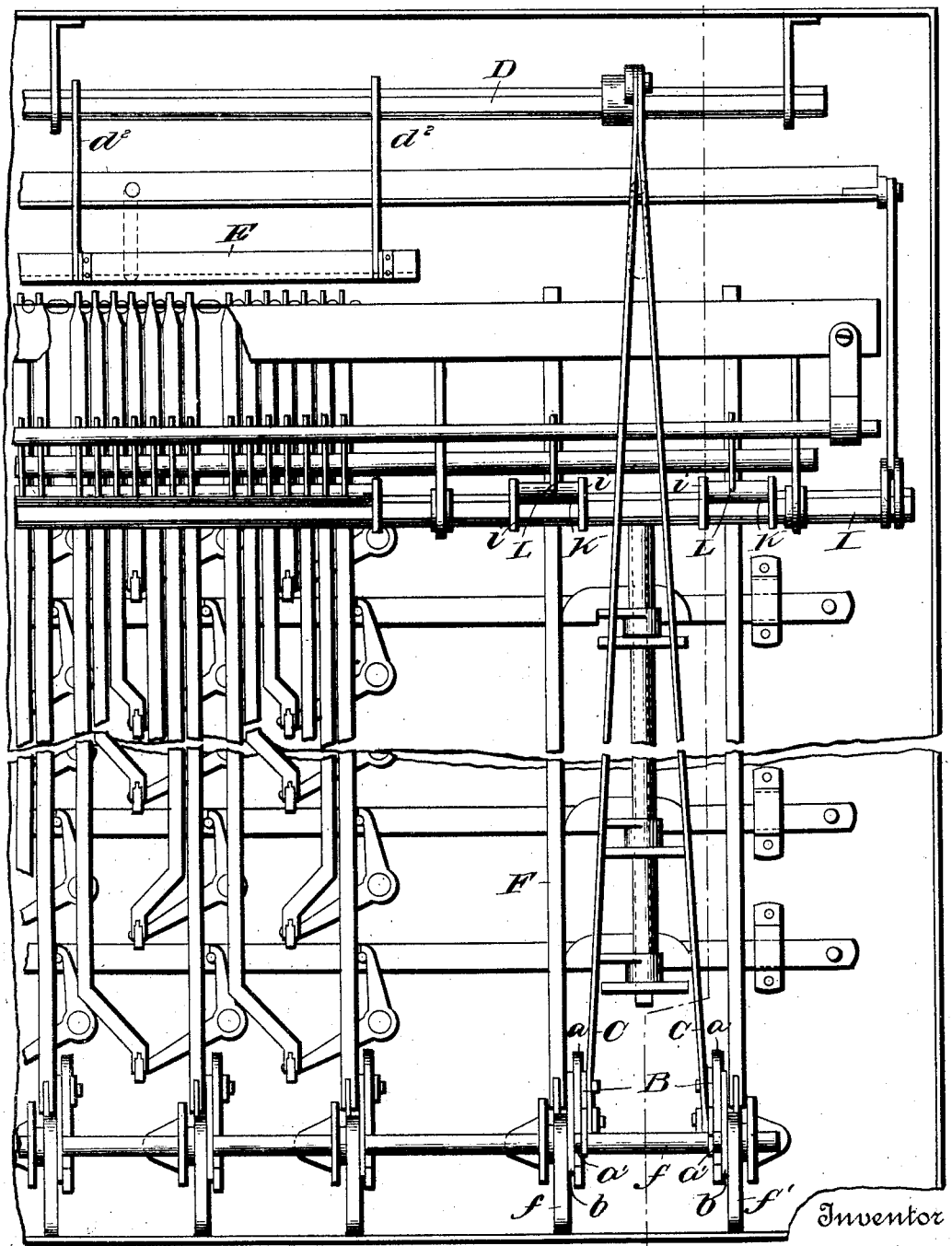

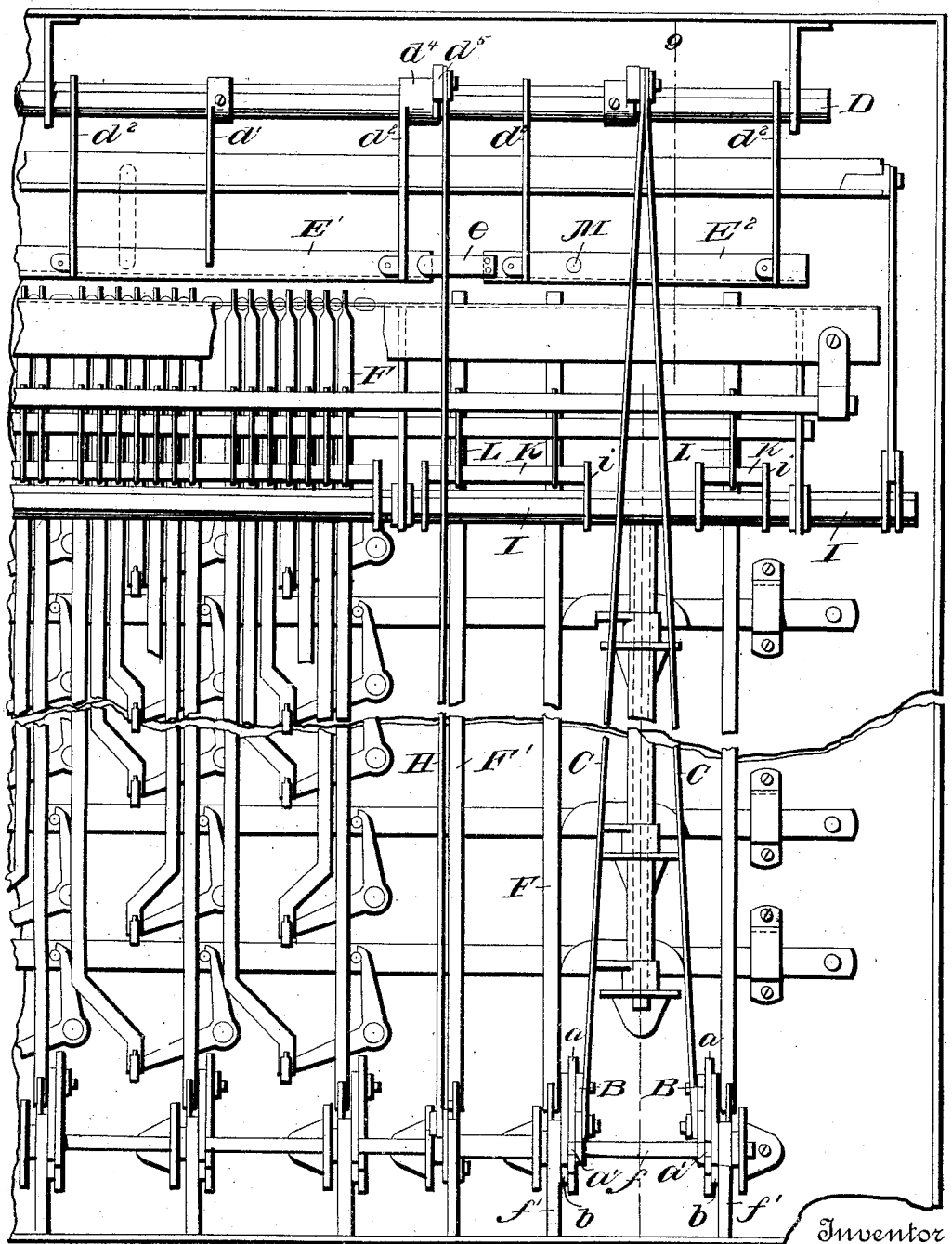

No. 853,867. PATENTED MAY 14, 1907.
G. S. DEY.
VOTING MACHINE.
APPLICATION FILED SEPT. 11, 1899.

7 SHEETS—SHEET 4.

Witnesses
L. C. Hills
Gustave R. Thompson

Inventor
G. S. Dey
by Wilkinson & Fisher
Attorneys.

No. 853,867.   
G. S. DEY.  
VOTING MACHINE.  
APPLICATION FILED SEPT. 11, 1899.
PATENTED MAY 14, 1907.
7 SHEETS—SHEET 6.
*Fig. 9.*
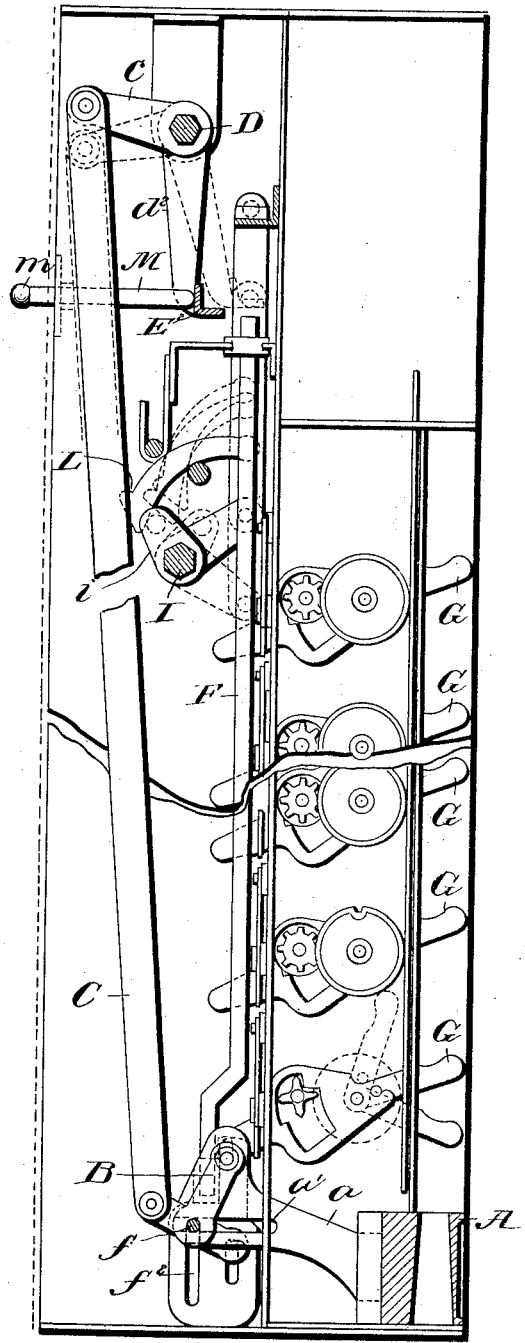
*Fig. 10.*
*Fig. 11.*
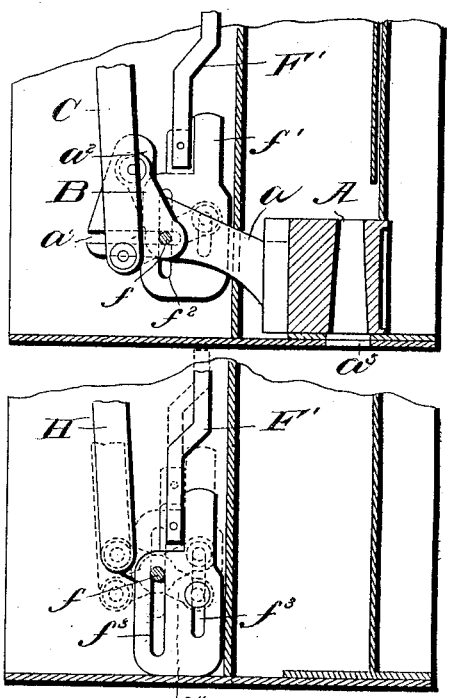
Witnesses  
L. C. Hills  
Gustave R. Thompson
Inventor  
G. S. Dey  
by Wilkinson & Fisher  
Attorneys No. 853,867. PATENTED MAY 14, 1907.
G. S. DEY.
VOTING MACHINE.
APPLICATION FILED SEPT. 11, 1899.

7 SHEETS—SHEET 7.

Witnesses
L. C. Hills
G. R. Thompson

Inventor
G. S. Dey
by Wilkinson & Fisher
Attorneys

UNITED STATES PATENT OFFICE.

GILBERT S. DEY, OF ROCHESTER, NEW YORK, ASSIGNOR, BY MESNE ASSIGNMENTS, TO U. S. STANDARD VOTING MACHINE CO., OF ROCHESTER, NEW YORK, A CORPORATION OF NEW YORK.

VOTING-MACHINE.

No. 853,867.　　　Specification of Letters Patent.　　　Patented May 14, 1907.

Application filed September 11, 1899. Serial No. 730,128.

*To all whom it may concern:*

Be it known that I, GILBERT S. DEY, a citizen of the United States, residing at Rochester, in the county of Monroe and State of New York, have invented certain new and useful Improvements in Voting-Machines; and I do hereby declare the following to be a full, clear, and exact description of the invention, such as will enable others skilled in the art to which it appertains to make and use the same.

My invention relates to voting machines and more particularly to means whereby a part of the voting keys or mechanisms may be locked out so that a voter on appearing before the face of the machine will find all the keys locked or prevented from movement except those belonging to the offices, as to which he is qualified to vote. For example, in some States women are allowed to vote for school commissioners but for no other officers. By means of this invention, a woman could be prevented from voting for any candidates, except those for the office of school commissioner.

The main object of my invention is to provide simple and effective means which may be operated by the election officers to lock out certain of the voting mechanisms.

Figure 7:
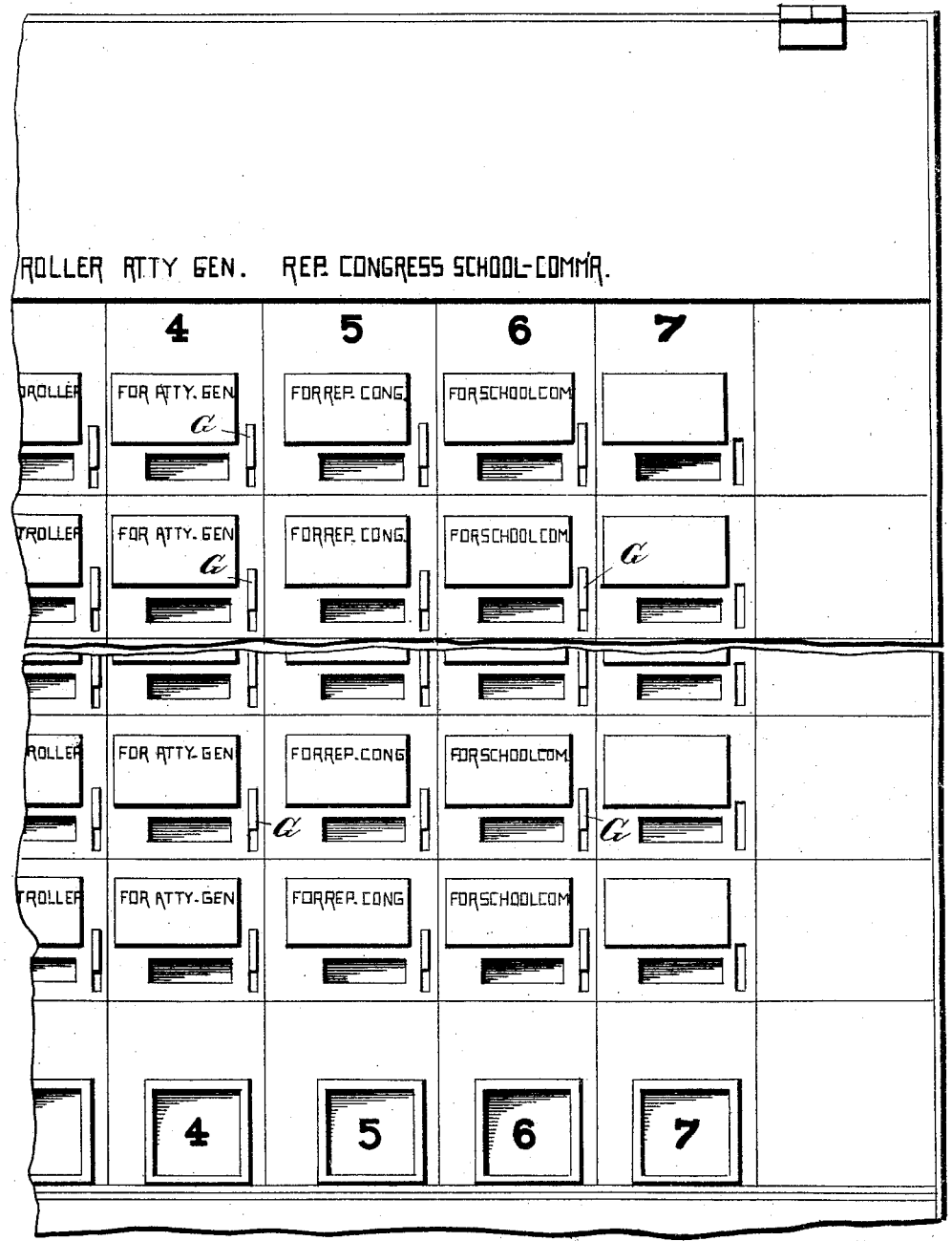
Figure 8:
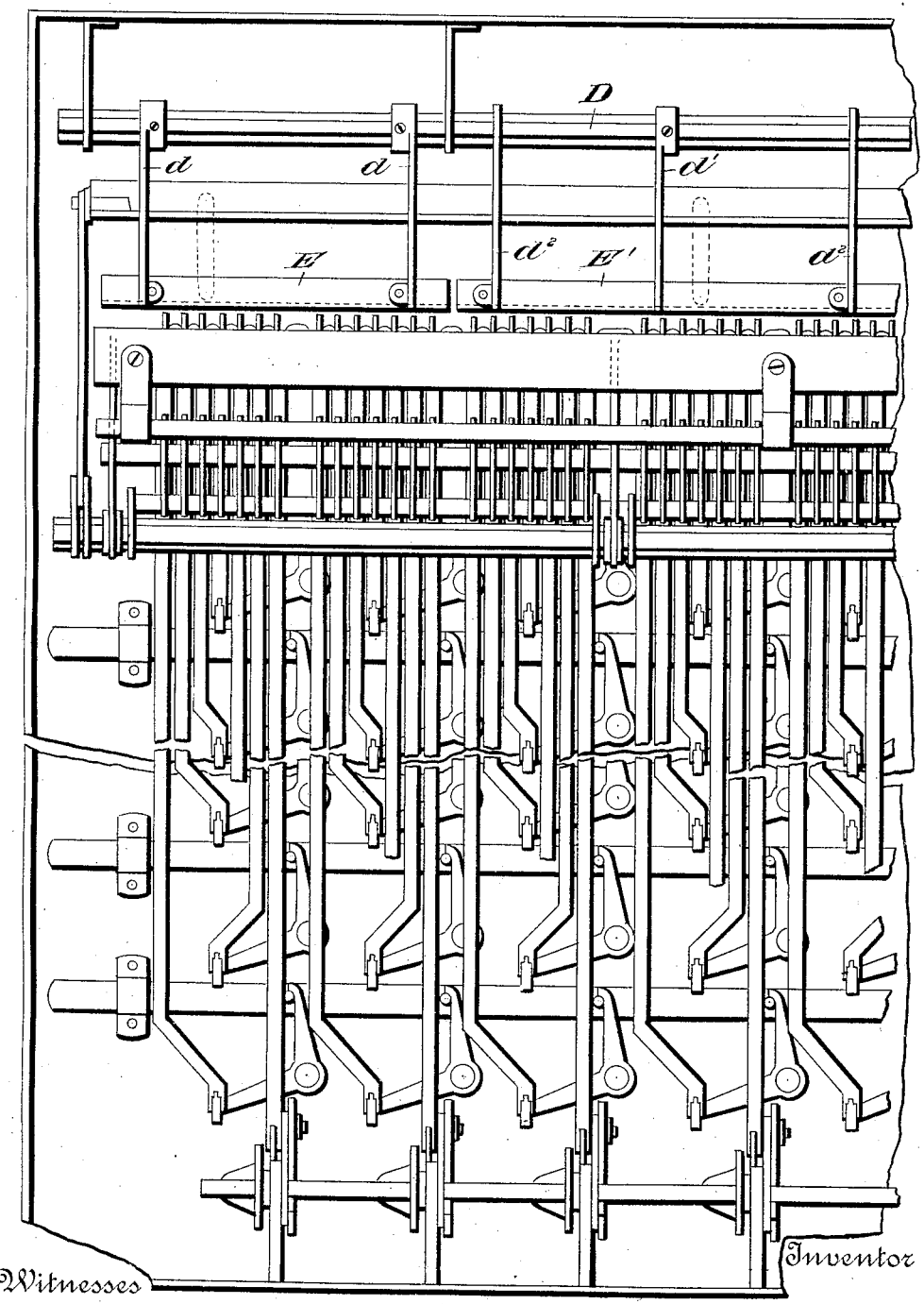
Figure 12:
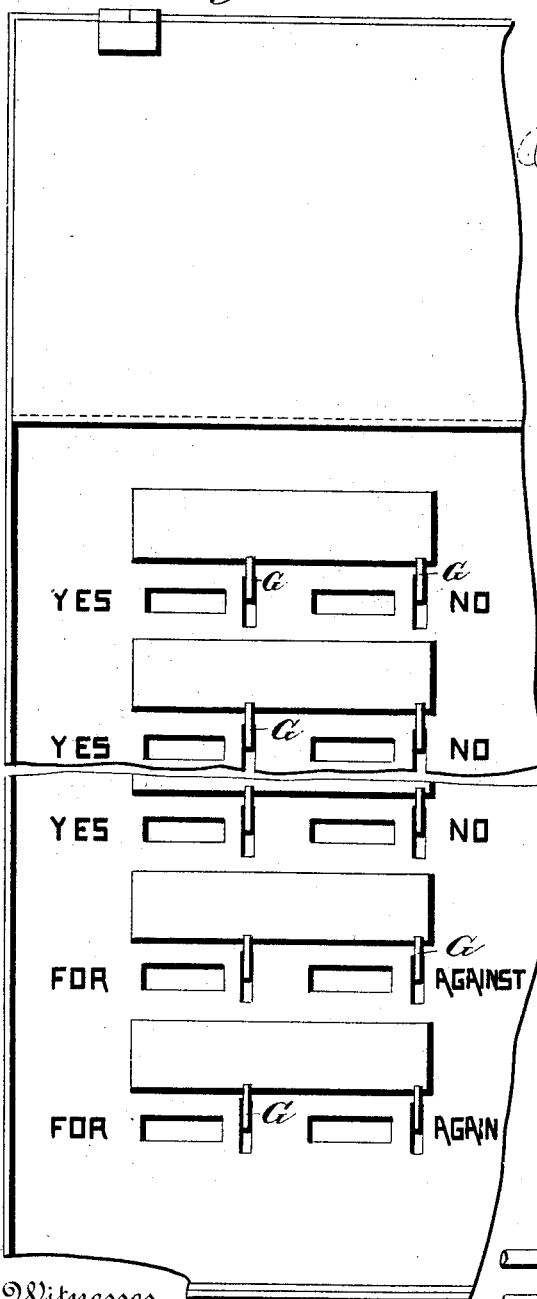
Figure 13:
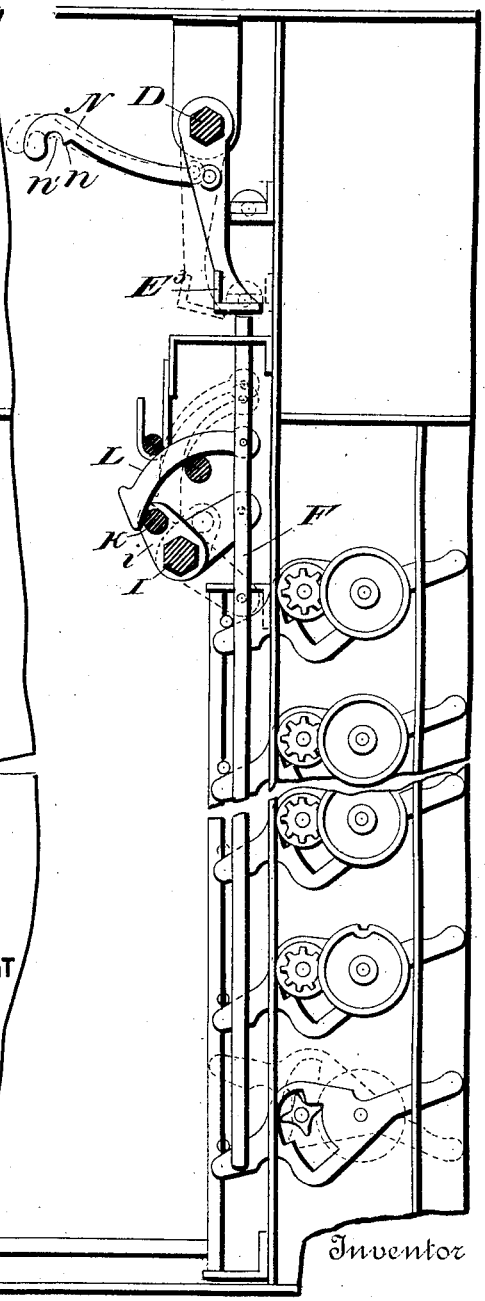

In the accompanying drawings, Figure 1 is a broken view illustrating part of the face plate of my improved machine. Fig. 2 is a broken transverse sectional view taken on the line 2—2 in Fig. 1, of my complete machine. Fig. 3 and 4 illustrate details of the irregular voting mechanism. Fig. 5 is a broken rear view of my machine, back plate having been removed, showing the straight irregular voting mechanism. Fig. 6 is a similar view showing the straight irregular voting mechanism and means for locking out a specified portion of the machine. Fig. 7 is a broken front view showing the right hand part of the face plate of the machine. Fig. 8 is a broken rear view, with the back plate removed, of my machine, showing the opposite end from what is shown in Figs. 5 and 6. Fig. 9 is a transverse sectional view of the machine taken on the line 9—9 in Fig. 6. Fig. 10 and 11 illustrate details of the straight irregular voting mechanism and locking out mechanism. Fig. 12 is a broken front view of part of the face plate showing the questions voting mechanisms, and Fig. 13 is a side view with the casing remove, showing a modification of the means for locking out a specified portion of the machine.

The keys, counters, interlocking means and straight ticket voting means are of the usual types and do not require a detailed description, as they have been shown merely to illustrate a complete machine.

The particular improvements covered by the present invention are confined to the straight irregular mechanism and the mechanism for locking out a part of the machine, so that it cannot be operated by a voter who is not entitled to vote a full ticket.

A represents the straight irregular receptacle in which a ballot may be deposited and then pushed back, whereupon the ballot drops into a second receptacle (not shown). This action also locks the entire machine. This locking action is accomplished in the following manner: To the rear of the straight irregular receptacle is fastened an arm $a$ which is provided with a slot $a'$, and an upwardly projecting portion or arm $a^2$. In the arm $a^2$ is journaled one end of a bell crank lever B, the pivot point of which engages the slot $a'$. To the other end of the bell crank lever is pivoted an arm C, of which there are two, one on each side of the straight irregular voting device. The upper end of this arm is attached to a link $c$, which is rigidly attached to a hexagonal shaft D. On this shaft are fixed arms $d$—$d'$, so that the partial revolution of this shaft will swing these arms forward, as shown in dotted lines in Fig. 9. On this bar are loosely mounted arms $d^2$. On the arms $d$ and $d^2$ are mounted angle bars E, $E^1$ and $E^2$, which are located in the same line but do not touch each other. An extension $e$ is fastened to the bar $E^2$ and overlaps the bar $E^1$. By this construction, when the link $c$ is drawn down by the arms C, the entire machine is locked, since the bars E, $E^1$ and $E^2$ are, by means of the arms $d$—$d'$ and extension $e$, brought directly over the interlocking rods F, holding them against upward motion and thereby preventing the operation of the keys G.

By the operation of the irregular voting mechanism, the locking rods F connecting therewith, are also operated. To each of these rods is attached a bracket $f^1$, which is provided with two slots, $f^2$ and $f^3$. Through the slot $f^2$ runs the shaft $f$, which thereby guides the motion of the bracket $f'$. To the bell crank lever B is attached an arm $b$ which is provided with a pin which enters the slot $f^3$. The motion, therefore, of the arm $a$ of the irregular voting mechanism not only pulls down the arms C, but also through the movement of the bell crank lever B and arm $b$ elevates the bracket $f'$ and with it the interlocking rod F. This rod has provided upon it, a curved stop L, which is adapted to engage when elevated with the rod K, thereby holding it in an elevated position. The rod K is attached to the rock shaft I by means of links $i$. The rock shaft I is operated by the resetting mechanism through the medium of the links $i^1$ and $i^2$ in the usual manner. It will thus be seen that after the irregular voting mechanism has once been operated by a voter, it cannot be withdrawn by the same voter, but will remain locked against movement, until it is reset again in its normal position by the resetting mechanism, which is of a well known type.

To the bearing $d^4$ (see Fig. 6) is attached a link $d^5$. To this link is attached a connecting rod H which by means of the connection shown in Fig. 11 operates the locking rod F' and through the medium of the parts I K L prevents the mechanism from coming back to its normal position under the influence of gravity before it is operated by the resetting mechanism. The movement of the rod F' is accomplished by means of a link $f^4$ pivoted on the shaft $f$ and carrying a pin on one end which engages with the slot $f^3$ in the bracket $f'$ which carries the rod F', all as shown in Fig. 11.

In Fig. 9 is shown the particular means for locking out a specified portion of the machine. It is shown as locking out everything but the rows of candidates for school commissioner, (rows number 6 and 7 on Fig. 7) and to the plate $E^2$ is attached a handle M, which passes through the back casing of the machine and is provided with a knob $m$. The election official pushes the handle M forward, when for example, a woman is admitted to the booth, whereupon the plate $E^2$ will move over the interlocking rods of the straight irregular voting mechanism and by means of the extension $e$ will move the plate E' over all the other interlocking rods F with the exception of those shown on the extreme left of Fig. 8, in proximity to which is the bar E. This bar E is not moved forward over the corresponding interlocking rods, for the reason that it is fixed to the shaft D by means of the arms $d$, while the bars $E^1$ and $E^2$ are loosely mounted on the shaft D and can therefore be carried forward by the movement of the handle M. The movement of the bar $E^1$, by means of the connecting rod H and the interlocking rod $F^1$, holds the bars $E^1$ and $E^2$ over the corresponding interlocking rods, until said bars are restored to their former position by the action of the resetting mechanism. In Figs. 12 and 13 is shown means for locking another part of the machine, through the rear of the machine projects a handle N provided with notches $n$ $n'$. The locking bar $E^3$ is supported on the shaft D by means of links, to one of which the handle N is pivoted. It will be seen without further explanation that the bar $E^3$ may be swung over the interlocking rods F of the questions or amendment mechanism, and the notches $n$ and $n'$, engaging with the rear casing, serve to hold said bar either in or out of the engagement with the rod F as may be desired.

It will be recognized by those skilled in the art, that many changes may be made without departing from the spirit of my invention. I wish it, therefore, to be strictly understood that I do not limit myself to the exact construction shown and described.

Having thus described my invention what I claim is new and desire to secure by Letters Patent of the United States is:—

1. In a voting machine, the combination of straight irregular voting mechanism, ordinary voting mechanism, interlocking mechanism, including rods, actuated thereby, and swinging plates or bars adapted to be moved either over all or some of said interlocking rods to prevent the movement thereof, whereby a partially qualified voter is prevented from voting improperly, substantially as described.

2. In a voting machine, the combination of straight irregular voting mechanism, regular voting mechanism, interlocking mechanism actuated thereby and a sectional plate or bar supported upon a rock shaft, the parts being so arranged that said sections may lock the entire machine by the operation of the straight irregular voting mechanism or a specified part thereof.

3. In a voting machine, the combination of straight irregular voting mechanism, regular voting mechanism, and interlocking mechanism actuated thereby, with a rock shaft, links depending from said rock shaft, a sectional bar supported by some of said links, means for moving certain sections of said bar to lock out a specified portion of the voting mechanisms, and means for locking the entire machine by the operation of the straight irregular voting mechanism.

4. In a voting machine, the combination of voting mechanism, interlocking mechanism, stops carried by said interlocking mechanism, a rock shaft, links depending from said rock shaft, straight irregular voting devices and connections between said rock shaft and said irregular voting device and said stops.

5. In a voting machine, the combination of straight irregular voting mechanism, interlocking mechanism, a sectional bar E, E¹, E², the links $d^1$ and $d^2$, the rock shaft D, means for moving said bar to lock all or part of the interlocking mechanism and connections between said rock shaft and irregular voting mechanism.

6. In a voting machine, the combination with the casing of the machine, a toothed handle projecting through said casing, a sectional bar to which said handle is attached, links supporting said bar, a shaft on which said links are mounted, and interlocking mechanism.

7. In a voting machine, the combination with the casing of the machine, a toothed handle projecting through said casing, a sectional bar to which said handle is attached, links supporting said bar, a shaft on which said links are mounted, and interlocking mechanism, and means for holding said bar, or a part of it, in proximity to the interlocking mechanism, thereby preventing movement of the latter, substantially as described.

8. In a voting machine, a plurality of voting mechanisms, arranged in different office groups, a locking bar mounted in proximity to said voting mechanisms and consisting of a plurality of independently movable sections, any one or more of which may be moved into locking engagement with one or more of said office groups.

9. In a voting machine, a plurality of voting mechanisms arranged in different office groups, a locking bar pivotally mounted on a shaft in proximity to said voting mechanisms, and consisting of independently movable sections, one or more of which may be moved into locking relation with one or more of said office groups.

10. In a voting machine, a plurality of voting mechanisms arranged in different office groups, a locking device mounted in proximity to said voting mechanisms and consisting of a plurality of independently movable sections, one each for a plurality of office groups, any one or more of which may be moved into locking relation to one or more of said office groups.

11. In a voting machine, a plurality of voting mechanisms arranged in different office groups, a locking device mounted upon a shaft in proximity to said voting mechanisms and consisting of a plurality of adjustable sections, one or more of which may be moved into locking relation with one or more of said office groups.

In testimony whereof, I affix my signature, in presence of two witnesses.

GILBERT S. DEY.

Witnesses:
GEO. S. HASTINGS,
GEO. A. GILLETTE.